(12) United States Patent
Yao et al.

(10) Patent No.: US 11,658,969 B2
(45) Date of Patent: May 23, 2023

(54) APPARATUSES AND METHODS FOR FACILITATING PORT DISCERNMENT DRIVEN MUTUAL AUTHENTICATION AND SERVICE ACCESS AUTHORIZATION

(71) Applicant: AT&T Intellectual Property I, L.P., Atlanta, GA (US)

(72) Inventors: Timothy Yao, Redmond, WA (US); Christopher Bryant, Duvall, WA (US); Qun Wei, Redmond, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 257 days.

(21) Appl. No.: 16/953,388

(22) Filed: Nov. 20, 2020

(65) Prior Publication Data

US 2022/0166772 A1 May 26, 2022

(51) Int. Cl.
*H04L 9/40* (2022.01)
*H04N 21/254* (2011.01)

(52) U.S. Cl.
CPC ...... *H04L 63/0876* (2013.01); *H04L 63/0823* (2013.01); *H04L 63/0869* (2013.01); *H04L 63/18* (2013.01); *H04N 21/2542* (2013.01)

(58) Field of Classification Search
CPC ............ H04L 63/0876; H04L 63/0823; H04L 63/0869; H04L 63/18; H04L 63/101; H04N 21/2542
See application file for complete search history.

(56) References Cited

U.S. PATENT DOCUMENTS

| | | | | |
|---|---|---|---|---|
| 2002/0188840 A1* | 12/2002 | Echizen | ............... | H04L 63/0428 713/153 |
| 2003/0051151 A1* | 3/2003 | Asano | ............... | G11B 20/00507 713/193 |
| 2006/0093138 A1* | 5/2006 | Durand | ................. | H04L 9/0844 380/44 |
| 2010/0036950 A1* | 2/2010 | Bae | ......................... | H04L 67/56 709/225 |
| 2010/0186065 A1* | 7/2010 | Chung | ................. | H04N 7/1675 726/1 |

(Continued)

OTHER PUBLICATIONS

"North America RCS Common Implementation Guidelines", GSMA Association, Version 6.0, Dec. 2, 2019, 28 pages.

*Primary Examiner* — Huan V Doan
(74) *Attorney, Agent, or Firm* — Guntin & Gust, PLC; Mark Wilinski

(57) ABSTRACT

Aspects of the subject disclosure may include, for example, receiving, by a processing system including a processor that is operative in a first communication network, a certificate from a communication device that is operative in a second communication network, extracting, by the processing system, an identifier of the communication device from the certificate, authenticating, by the processing system, the communication device in accordance with the identifier, comparing, by the processing system, the identifier with a plurality of identifiers to determine that the communication device is authorized to access data, resulting in an authorization determination, and transmitting, by the processing system, the data to the communication device based on the authorization determination. Other embodiments are disclosed.

20 Claims, 8 Drawing Sheets

(56) References Cited

U.S. PATENT DOCUMENTS

| | | | |
|---|---|---|---|
| 2011/0191445 A1* | 8/2011 | Dazzi | G06F 15/16 |
| | | | 709/219 |
| 2013/0174271 A1* | 7/2013 | Handal | G06Q 30/0267 |
| | | | 726/27 |
| 2015/0149778 A1* | 5/2015 | Nakano | H04L 63/0869 |
| | | | 713/169 |
| 2019/0124049 A1* | 4/2019 | Bradley | H04L 12/2809 |
| 2020/0186358 A1* | 6/2020 | Capola | H04L 63/0876 |

\* cited by examiner

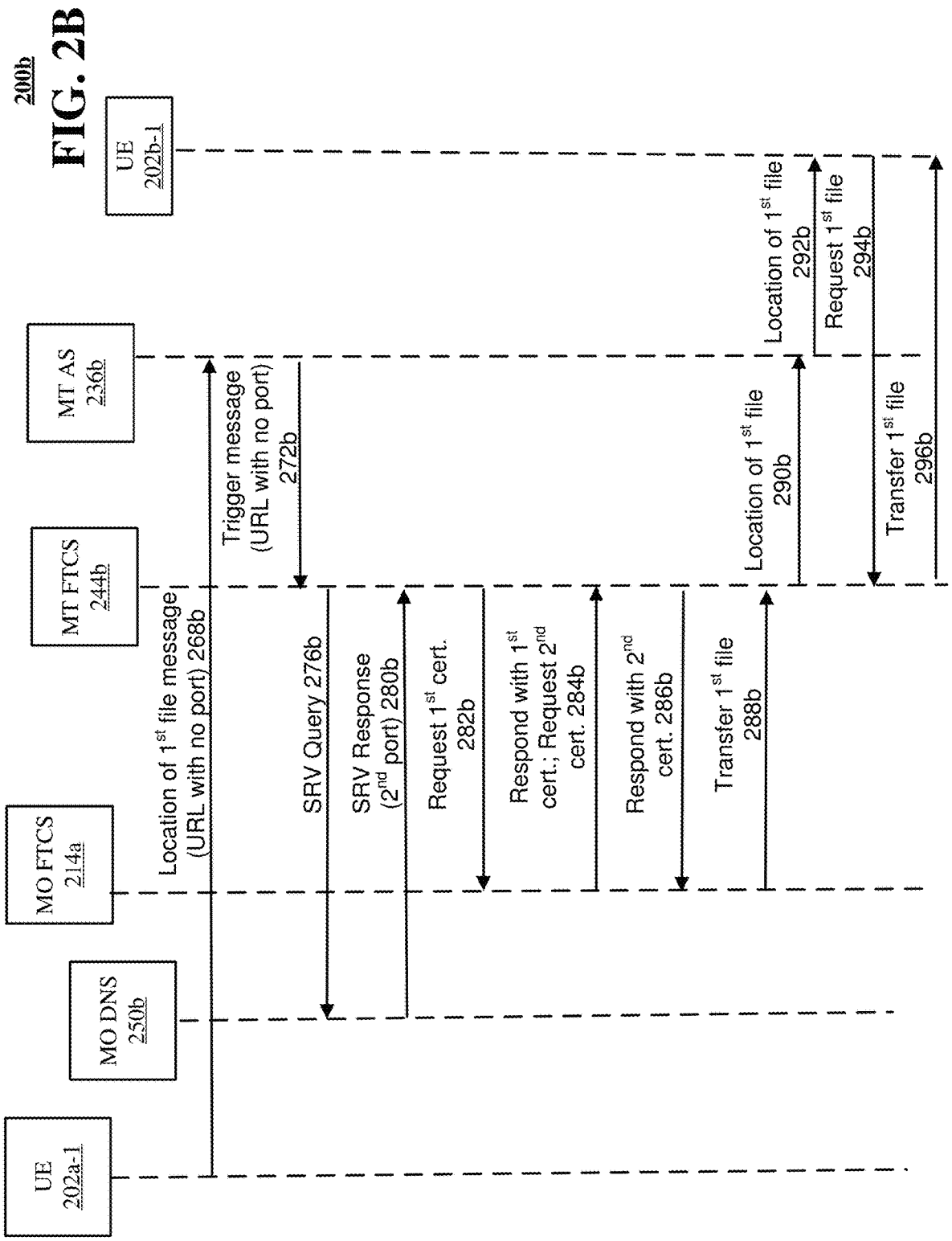

300

US 11,658,969 B2

APPARATUSES AND METHODS FOR FACILITATING PORT DISCERNMENT DRIVEN MUTUAL AUTHENTICATION AND SERVICE ACCESS AUTHORIZATION

FIELD OF THE DISCLOSURE

The subject disclosure relates to apparatuses and methods for facilitating port discernment driven mutual authentication and service access authorization.

BACKGROUND

As the world becomes increasingly connected through vast communication networks and via various communication devices, additional opportunities are created to distribute or disseminate content to users. However, the use of such networks and devices imposes challenges in terms of ensuring integrity and security. For example, in a client-server architecture/platform, if a server cannot authenticate a client the server cannot properly authorize access to services that the server provides. In this respect, the server can either deny the client access to the services (potentially even when the client is otherwise authorized to access the services) or the server can blindly allow the client access to the services (potentially even when the client otherwise lacks authorization). As this example demonstrate, enhancements are needed in terms of authentication and authorization in respect of a provisioning of services.

BRIEF DESCRIPTION OF THE DRAWINGS

Reference will now be made to the accompanying drawings, which are not necessarily drawn to scale, and wherein:

FIGS. 2A-2B are block diagrams illustrating an example, non-limiting embodiments of systems functioning within the communication network of FIG. 1 in accordance with various aspects described herein.

DETAILED DESCRIPTION

Figure 1:
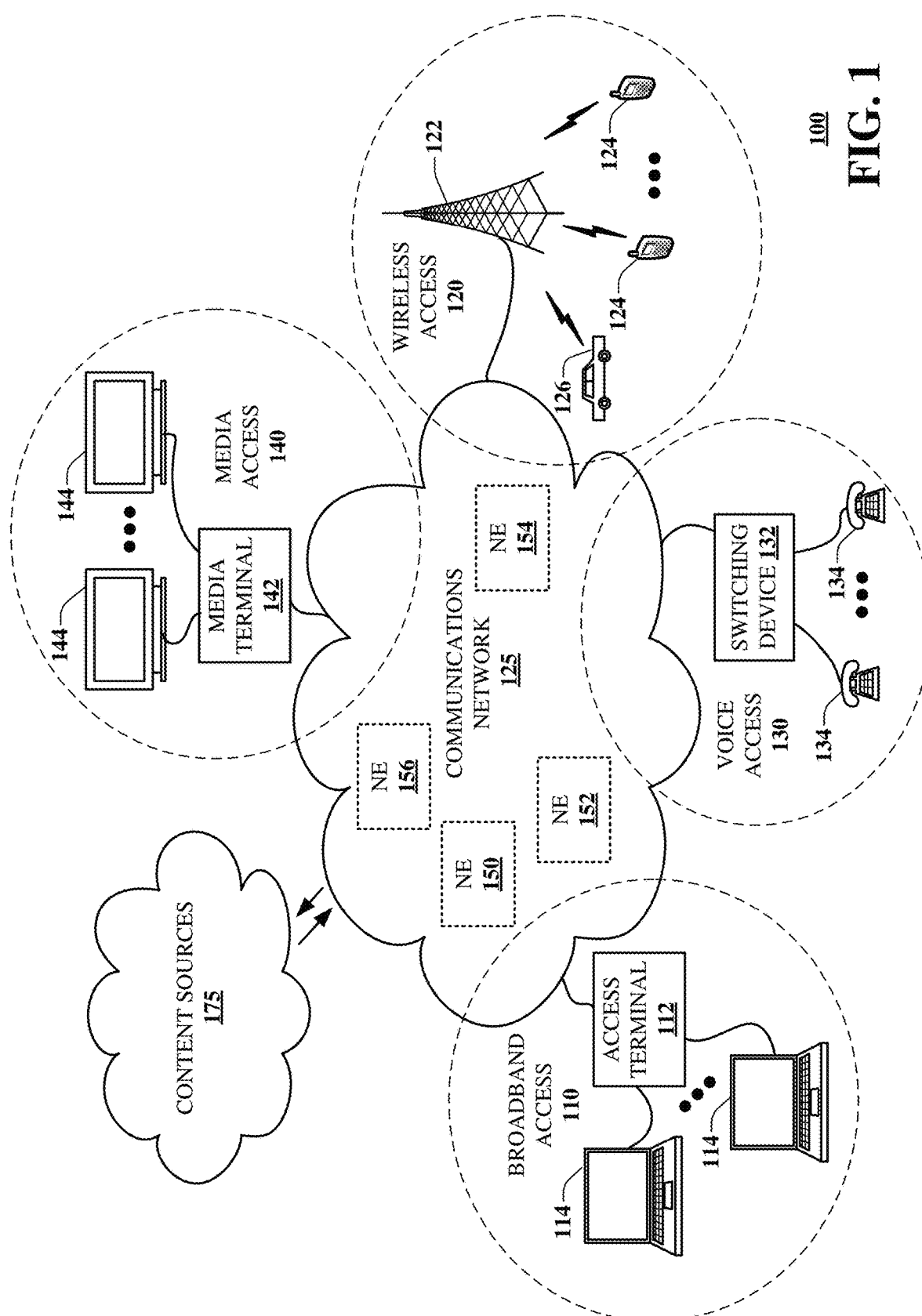
FIG. 1 is a block diagram illustrating an exemplary, non-limiting embodiment of a communications network in accordance with various aspects described herein.

The subject disclosure describes, among other things, illustrative embodiments for authenticating a device, determining that the device is authorized to access data, and granting access to the data on the basis of the authenticating and/or the determining. Other embodiments are described in the subject disclosure.

One or more aspects of the subject disclosure include, in whole or in part, identifying a type of communication traffic as occurring between a device and a client, wherein the device is operative in a first communication network and the client is operative in a second communication network that is different from the first communication network, transmitting a first request to the client for a first certificate based on the identifying of the type of communication traffic, obtaining the first certificate from the client, wherein the first certificate includes a first identifier of the client, extracting the first identifier from the first certificate, resulting in an extracted identifier, determining that the client is authorized to obtain a file based on the extracted identifier, and transmitting the file to the client based on the determining that the client is authorized to obtain the file.

One or more aspects of the subject disclosure include, in whole or in part, receiving, by a processing system, a first message from at least one communication device that is operative in a first network, wherein the first message includes an indication of a location of a file on a server that is operative in the first network, wherein the first message excludes an indication of a port, and wherein the processing system is operative in a second network that is different from the first network, transmitting, by the processing system, a query responsive to the receiving of the first message, obtaining, by the processing system, a second message based on the transmitting of the query, wherein the second message includes an indication of a first port, engaging, by the processing system, an authentication process whereby the processing system authenticates a first identity of the server and the server authenticates a second identity of the processing system, and receiving, by the processing system, the file from the server via the first port based on the engaging of the authentication process.

One or more aspects of the subject disclosure include, in whole or in part, receiving, by a processing system including a processor that is operative in a first communication network, a certificate from a communication device that is operative in a second communication network, extracting, by the processing system, an identifier of the communication device from the certificate, authenticating, by the processing system, the communication device in accordance with the identifier, comparing, by the processing system, the identifier with a plurality of identifiers to determine that the communication device is authorized to access data, resulting in an authorization determination, and transmitting, by the processing system, the data to the communication device based on the authorization determination.

Referring now to FIG. 1, a block diagram is shown illustrating an example, non-limiting embodiment of a system 100 in accordance with various aspects described herein. For example, system 100 can facilitate in whole or in part identifying a type of communication traffic as occurring between a device and a client, wherein the device is operative in a first communication network and the client is operative in a second communication network that is different from the first communication network, responsive to the identifying of the type of communication traffic, transmitting a first request to the client for a first certificate, obtaining the first certificate from the client, wherein the first certificate includes a first identifier of the client, obtaining a second request from the client for a second certificate, transmitting the second certificate to the client, extracting the first identifier from the first certificate, resulting in an extracted identifier, determining that the client is authorized to obtain a file based on the extracted identifier, and transmitting the file to the client based on the determining that the client is authorized to obtain the file. System 100 can facilitate in whole or in part receiving, by a processing system, a first message from at least one communication device that is operative in a first network, wherein the first message includes an indication of a location of a file on a server that is operative in the first network, wherein the first message excludes an indication of a port, and wherein the processing system is operative in a second network that is different from the first network, transmitting, by the processing system, a query responsive to the receiving of the first message, obtaining, by the processing system, a second message based on the transmitting of the query, wherein the second message includes an indication of a first port, engaging, by the processing system, an authentication process whereby the processing system authenticates a first identity of the server and the server authenticates a second identity of the processing system, and receiving, by the processing system, the file from the server via the first port based on the engaging of the authentication process. System 100 can facilitate in whole or in part receiving, by a processing system including a processor that is operative in a first communication network, a certificate from a communication device that is operative in a second communication network, extracting, by the processing system, an identifier of the communication device from the certificate, authenticating, by the processing system, the communication device in accordance with the identifier, comparing, by the processing system, the identifier with a plurality of identifiers to determine that the communication device is authorized to access data, resulting in an authorization determination, and transmitting, by the processing system, the data to the communication device based on the authorization determination In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
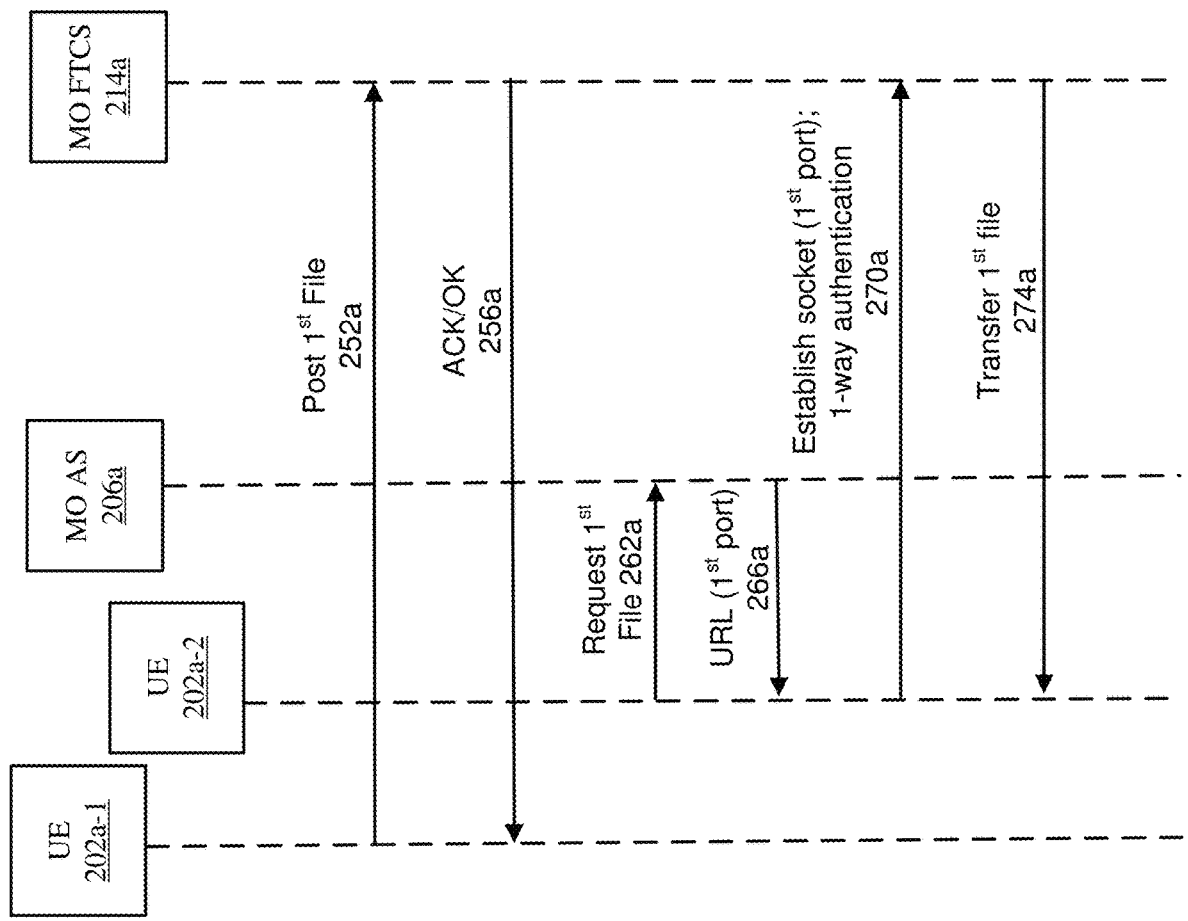

FIGS. 2A and 2B are block diagrams illustrating example, non-limiting embodiments of systems 200a and 200b, respectively. The system 200a and/or the system 200b may function within, and/or may be operatively overlaid upon, the communication network 100 of FIG. 1 in accordance with various aspects described herein. While shown and described separately, in some embodiments one or more aspects associated with the system 200a may be combined with one or more aspects of the system 200b.

The system 200a, which may be associated with a first mobile network operator (MNO), may include one or more communication devices, such as for example a first user equipment (UE) 202a-1, a second UE 202a-2, a mobile originated (MO) application server (AS) 206a, and a MO file transfer content server (FTCS) 214a. While shown separately in FIG. 2A, in some embodiments two or more of the communication devices (such as, for example, the MO AS 206a, the MO DNS 210a, and/or the MO FTCS 214a) may be included within a common casing or housing. In some embodiments, functionality/operations attributed to a first communication device (as set forth in further detail below) may be attributed to/associated with one or more of the other communication devices.

The system 200a may facilitate one or more file transfer operations. As shown in an operation 252a, the first UE 202a-1 may provide/transmit a first file to, e.g., the MO FTCS 214a. The operation 252a may correspond to an upload/posting of the first file to the MO FTCS 214a, such that the first file may be stored by the MO FTCS 214a. Based on saving/storing the first file, the MO FTCS 214a may send an 'OK' or acknowledgement (ACK) message to the first UE 202a-1 as shown in an operation 256a. As part of the operation 256a (e.g., as part of the ACK/OK message), the MO FTCS 214a may provide an identification/indication of a location (e.g., an address) on the MO FTCS 214a where the first file is saved/stored on the MO FTCS 214a.

As part of an operation 262a, the second UE 202a-2 may initiate/transmit a request for the first file saved/stored by the MO FTCS 214a. The request may be obtained by the MO AS 206a. In response to obtaining the request, the MO AS 206a may provide/transmit a uniform resource locator (URL) with a first port number included therein as part of an operation 266a.

As part of an operation 270a, the second UE 202a-2 may establish a socket with, e.g., the MO FTCS 214a using the first port number specified in the URL of the operation 266a. As part of the operation 270a, a one-way authentication may be provided/obtained/realized, whereby the second UE 202a-2 may authenticate the MO FTCS 214a and the MO FTCS 214a might not authenticate the second UE 202a-2. As one of skill in the art would appreciate, one or more certificates may be used to facilitate authentication.

Based on, or in response to, an execution of the operation 270a, the MO FTCS 214a may provide/transmit the first file to the second UE 202a-2 as part of an operation 274a. The second UE 202a-2 may record/save/store the first file as part of the operation 274a. To the extent that the first file pertains to content (e.g., media), the second UE 202a-2 may facilitate a presentation (e.g., a playback) of the content as part of the operation 274a.

The operations 252a-274a set forth above may be indicative of so-called user-network interface (UNI) traffic, whereby the first MNO may facilitate a conveyance of communication traffic (e.g., a conveyance of the first file) in the system 200a in relation to subscribers/users (e.g., the first UE 202a-1 and the second UE 202a-2 being indicative/ representative of two subscribers/users) of the first MNO. As set forth above in relation to the operation 270a, a one-way authentication may be utilized (whereby a client authenticates an identity of a server, but the server does not authenticate an identity of the client) as part of a conveyance of UNI traffic. This is because the number of subscribers/users accommodated by the first MNO is typically large (e.g., in the realm of 10 million or more) in practical embodiments, such that it may be infeasible for the MO FTCS 214a to maintain all of the certificates associated with the subscribers/users of the first MNO.

In many instances, MNOs may desire to collaborate with one another, potentially in accordance/conjunction with one or more agreements (e.g., contracts), specifications, or the like. For example, the first MNO described above may elect to collaborate with a second MNO for reasons of feasibility/ practicality (e.g., economic and/or technical feasibility), to enable/provide expanded product/service offerings to subscribers/users of the first MNO, etc. To demonstrate, the system 200b of FIG. 2B may include a mobile terminated (MT) AS 236b and a MT FTCS 244b, where the MT AS 236b and the MT FTCS 244b may be associated with the second MNO. The system 200b may include a MO domain name system (DNS) 250b that may be associated with the first MNO.

As described above, in relation to a given MNO (e.g., in relation to the second MNO associated with the system 200b) the number of users/subscribers that the given MNO directly supports or provides service to may be large (e.g., may be on the order of 10 million or more). If the given MNO is also tasked with indirectly providing service/support for users/subscribers of other MNOs (such as the first UE 202a-1 and the second UE 202a-2 of the first MNO in relation to the operations of the system 200b set forth below) as part of a collaborative relationship, the total number of users that the given MNO may have to support may grow exponentially. To reduce the effective, total count/number of users/subscribers that the given MNO needs to support (both directly and indirectly), an AS (e.g., the MO AS 206a) and/or a FTCS (e.g., the MO FTCS 214a) of the other MNO may effectively pool/aggregate requests from direct subscribers/users of the other MNO. Stated slightly differently, the AS and/or the FTCS of the other MNO may serve as an intermediary between the direct subscribers/users of the other MNO and the given MNO, thus effectively representing a singular client from the perspective of the given MNO.

For purposes of explaining the operations of FIG. 2B, it may be assumed that a direct subscriber/user of the second MNO (e.g., as represented by the UE 202b-1) desires/needs access to the first file that is hosted by the first MNO (e.g., that is hosted by the MO FTCS 214a described above in relation to the operations of FIG. 2A). In this regard, and in terms of the first file, the first MNO may effectively function as a server and the second MNO may effectively function as a client. More generally, a given MNO may function as a server with respect to another MNO in one instance (e.g., in the instance of a first file) and as a client of the another MNO in another instance (e.g., in the instance of a second file). Furthermore, once a client obtains a given file from a server, it may facilitate a distribution or dissemination of that given file (assuming appropriate permissions or authorizations are in place to effectuate such distribution/dissemination), and thus, may serve in the capacity of a server with respect to that file.

As shown in FIG. 2B, the UE 202a-1 may send/transmit a message as part of an operation 268b. The message of the operation 268b may include a URL, with no port number specified therein, representing the location of the first file on the MO FTCS 214a. For example, and as described above, the location of the first file may correspond to an address (or other identifier) of the MO FTCS 214a, whereby the UE 202a-1 obtained the location as part of the message of the operation 256a. The message transmitted by the UE 202a-1 may be received by the MT AS 236b as part of the operation 268b.

In response to receiving the message of the operation 268b, the MT AS 236b may send/transmit a trigger message in an operation 272b. The trigger message of the operation 272b may include the URL with no port specified therein. The trigger message may be received by the MT FTCS 244b as part of the operation 272b.

In response to receiving the trigger message of the operation 272b, the MT FTCS 244b may examine the URL and identify the lack of the port number specified therein. Based on the lack of the port number, the MT FTCS 244b may send/transmit a server (SRV) query as part of an operation 276b. The SRV query may be received by the MO DNS 250b as part of the operation 276b.

In response to receiving the SRV query of the operation 276b, the MO DNS 250b may send/transmit a SRV response in an operation 280b. The SRV response may include a second port number specified therein (where the second port number may be distinguished from the first port number used for purposes of UNI traffic as described above in relation to FIG. 2A). The SRV response may be received by the MT FTCS 244b as part of the operation 280b.

The MT FTCS 244b may use the second port number included in the SRV response to attempt to establish a socket. The establishment of the socket may be based on (e.g., may be conditioned on) a two-way, mutual authentication between the MO FTCS 214a and the MT FTCS 244b. For example, as part of the two-way authentication the MT FTCS 244b may transmit/send a request to the MO FTCS 214a for a first certificate of the MO FTCS 214a in an operation 282b. Responsive to receiving the request for the first certificate as part of the operation 282b, the MO FTCS 214a may respond with the first certificate in an operation 284b. As part of the operation 284b (or as part of another operation not shown in FIG. 2B), the MO FTCS 214 may request a second certificate of the MT FTCS 244b. Responsive to receiving the request for the second certificate, the MT FTCS 244b may respond with the second certificate in an operation 286b.

The MT FTCS 244b may authenticate the MO FTCS 214b based on the first certificate that the MT FTCS 244b receives as part of the operation 284b. Similarly, the MO FTCS 214a may authenticate the MT FTCS 244b based on the second certificate that the MO FTCS 214 receives as part of the operation 286b. Thus, a two-way authentication/handshake may be obtained/realized as between the MO FTCS 214a and the MT FTCS 244b. Based at least in part on the same, the abovementioned socket may be established.

The MO FTCS 214a may determine whether the MT FTCS 244b is authorized to access (e.g., download) the first file based on information contained in the second certificate of operation 286b. If the MT FTCS 244b is not authorized to access the first file, the MO FTCS 214a might not transfer the first file to the MT FTCS 244b. Otherwise, if the MT FTCS 244b is authorized to access the first file, the first file may be transferred/transmitted from the MO FTCS 214a to the MT FTCS 244b in an operation 288b.

Upon obtaining (e.g., downloading) the first file in the operation 288b, the MT FTCS 244b may provide the MT AS 236b with an identification/indication of a location (e.g., an address) on the MT FTCS 244b where the first file is saved/stored on the MT FTCS 244b in an operation 290b. The MT AS 236b may, in turn, provide that identification/indication of the location of the first file on the MT FTCS 244b to a UE 202b-1 as part of an operation 292b. While not shown in FIG. 2B, in some embodiments the operation 292b may be executed based on the UE 202b-1 generating and issuing a request for the first file.

In an operation 294b, the UE 202b-1 may request the first file from the MT FTCS 244b, referencing in the request the location of the first file on the MT FTCS 244b (as obtained by the UE 202b-1 as part of the operation 292b). The MT FTCS 244b may provide/transfer the first file to the UE 202b-1 in an operation 296b.

Thus, as described above in relation to the system 200b of FIG. 2B, two (or more) MNOs may engage in an exchange of communication traffic. This communication traffic may be referred to herein as network-to-network interface (NNI) traffic. In contrast to the one-way authentication used in the conveyance of UNI traffic, as described above NNI traffic may be conveyed in accordance with a two-way authentication between the MNOs.

While various operations are shown in FIGS. 2A-2B, is to be understood and appreciated that the claimed subject matter is not limited by the order of the operations, as some operations may occur in different orders and/or concurrently with other operations from what is depicted and described herein. Moreover, not all illustrated operations may be required to implement the methodological acts described herein. For example, while various operations of FIGS. 2A-2B were described in relation a "pull" model (whereby a UE generates a request for a file, and the file is subsequently obtained by the UE in accordance with the request), aspects of the disclosure may be implemented in accordance with a "push" model, whereby a file may be provided to a UE in the absence of a specific/affirmative request for the file by the UE. For example, a file may be provided to a UE using a "push" model based on, e.g., a determined/identified location of the UE, an examination/analysis of content (e.g., media content) consumed, recorded and/or presented by the UE (or a user of the UE), an examination/analysis/identification of communication sessions engaged in by the UE (or a user of the UE), a calendar or schedule associated with a user of the UE, etc.

Figure 2C:
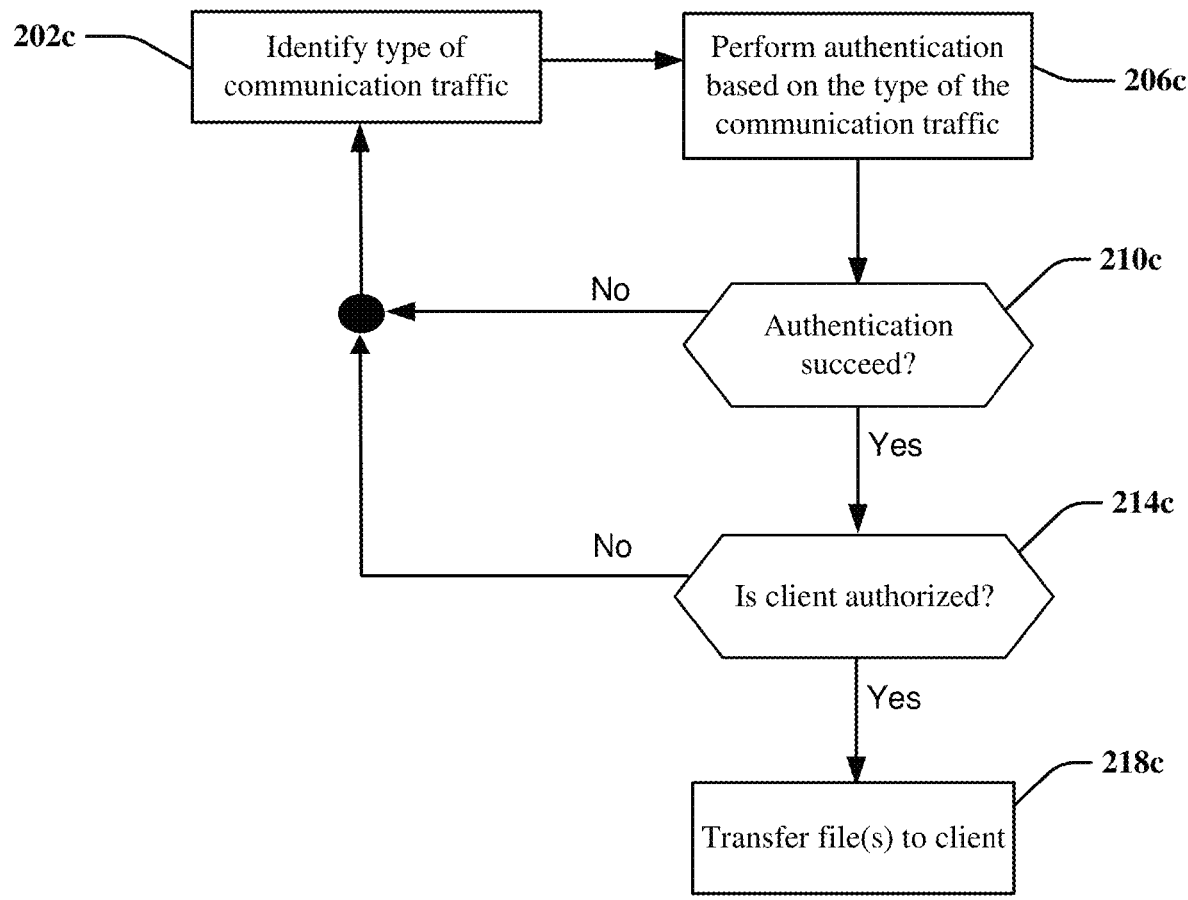
FIG. 2C depicts an illustrative embodiment of a method in accordance with various aspects described herein.

Referring now to FIG. 2C, an illustrative embodiment of a method 200c in accordance with various aspects described herein is shown. The method 200c may be executed, in whole or in part, by one or more systems, devices, and/or components, such as for example the systems, devices, and components set forth herein. One or more blocks/operations of the method 200c may incorporate aspects of the operations described above in relation to FIGS. 2A-2B. For reasons that will become clearer below, an execution of operations/blocks of the method 200c may facilitate an authorization of one or more communication devices in terms of a subset of the one or more communication devices obtaining (access to) one or more files.

In block 202c, a type of communication traffic may be identified. For example, as part of block 202c communication traffic (or associated requests and/or responses in relation to file transfer operations) may be identified as being UNI traffic and/or NNI traffic. In this regard, one or more identifiers associated with two or more communication devices may be examined as part of block 202c to determine whether the communication devices are part of a common or same MNO; in the event that they are, the communication traffic may be classified as UNI traffic, and otherwise, the communication traffic may be classified as NNI traffic.

In block 206c, an authentication of the communication devices of block 202c may be performed. The authentication of block 206c may be based on the identity/classification of the traffic obtained as part of block 202c. For example, if the communication traffic includes UNI traffic a one-way authentication may be performed. If the communication traffic includes NNI traffic a two-way authentication may be performed.

In block 210c, a determination may be made whether the authentication of block 206c was successful. If so, flow may proceed from block 210c to block 214c. On the other hand, if the authentication was not successful (e.g., the authentication was unsuccessful/failed), flow may proceed from block 210c to block 202c (to facilitate future executions of the method 200c).

In block 214c, a determination may be made whether a client is authorized. The determination of block 214c may be based in part on an identifier of the client included in a certificate. To demonstrate, and briefly referring to FIG. 2B, assuming that the client referred to in block 214c corresponds to the MT FTCS 244b, the second ($2^{nd}$) certificate of the operation 286b may include an identifier of the MT FTCS 244b. In some embodiments, the identifier may include (without limitation): a serial number, an IMSI, an IP address, etc. In some embodiments, the identifier may be generated and/or assigned by a network, generated by a device manufacturer or supplier, generated and/or assigned by another entity, etc. In some embodiments, identifiers may be shared amongst clients and/or devices; for example, an agreement or the like may provision a given identifier to a plurality of associated clients.

Based on obtaining the second certificate as part of the operation 286b, the MO FTCS 214a may extract the identifier included in the second certificate (resulting in an extracted identifier), and compare the extracted identifier to a list of identifiers of approved clients (where the list of approved clients may be referred to as a "whitelist"). If the extracted identifier is present in the whitelist, the client may be authorized and flow may proceed from block 214c to block 218c. On the other hand, if the extracted identifier is not present in the whitelist (e.g., the extracted identifier is absent from the whitelist), the client might not be authorized and flow may proceed from block 214c to block 202c (to facilitate future executions of the method 200c).

In block 218c, one or more files may be transferred to the client. The file(s) may be identified based on the authorization obtained in conjunction with block 214c. Stated slightly differently, while the authorization referred to above in block 214c was based on a Boolean decision/grade, in some embodiments multiple (e.g., three or more) levels or tiers of authorization may be utilized with different access rights/ capabilities that may be granted in respect of one or more files. To demonstrate, a first level/tier of authorization may correspond to an ability to access (e.g., download) a file, a second level/tier of authorization may correspond to an ability to record/save/store the file, a third level/tier of authorization may correspond to an ability to present (e.g., playback) the file, a fourth level/tier of authorization may correspond to an ability to transfer/transmit the file to one or more (other) devices, a fifth level/tier of authorization may correspond to an ability to edit the file, etc. The levels/tiers are not necessarily mutually exclusive of one another—e.g., different levels/tiers of authorization may be granted and/or combined with one another in some embodiments. A device (e.g., a client) may be enabled to perform one or more actions in accordance with the level/tier of authorization that is granted to it.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As the foregoing description of the method 200c of FIG. 2C demonstrates, access to and/or use of a file may be conditioned on the basis of authentication and authorization. For example, in some embodiments access to and/or use of a file by a client may be conditioned on an authentication process/algorithm returning a positive/successful result and/ or an authorization process/algorithm returning a positive/ successful result; if the authentication process or the authorization process fails, access to and/or use of the file may be denied.

As described above, aspects of this disclosure pertain to file transfer operations. Aspects of such file transfer operations may adhere or conform to one or more standards, protocols, specifications, or the like.

Aspects of this disclosure may be applied to a conveyance or transfer of data or information in one or more communication networks and/or in one or more communication systems. In some embodiments, the data or information may be organized as one or more files.

As described above, aspects of this disclosure may facilitate a transfer of information or data between communication devices in accordance with one or more agreements. In some embodiments, a transfer of a file (or any other operation in connection with the file) may be conditioned on a payment, subscription fee, license fee, or the like being satisfied.

Figure 3:
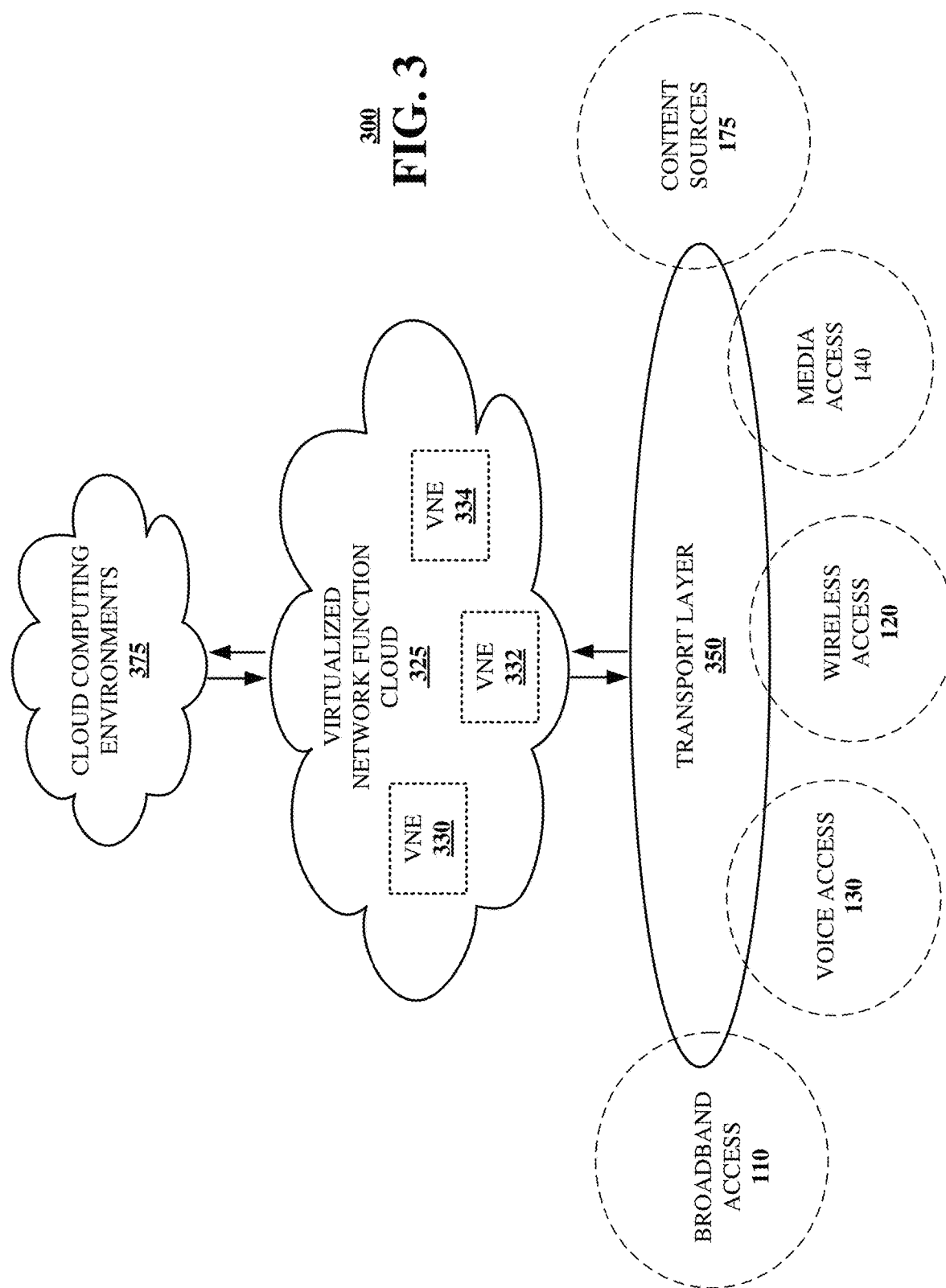
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of the systems 200a and 200b, and the method 200c presented in FIGS. 1, 2A, 2B, and 2C. For example, virtualized communication network 300 can facilitate in whole or in part identifying a type of communication traffic as occurring between a device and a client, wherein the device is operative in a first communication network and the client is operative in a second communication network that is different from the first communication network, responsive to the identifying of the type of communication traffic, transmitting a first request to the client for a first certificate, obtaining the first certificate from the client, wherein the first certificate includes a first identifier of the client, obtaining a second request from the client for a second certificate, transmitting the second certificate to the client, extracting the first identifier from the first certificate, resulting in an extracted identifier, determining that the client is authorized to obtain a file based on the extracted identifier, and transmitting the file to the client based on the determining that the client is authorized to obtain the file. Virtualized communication network 300 can facilitate in whole or in part receiving, by a processing system, a first message from at least one communication device that is operative in a first network, wherein the first message includes an indication of a location of a file on a server that is operative in the first network, wherein the first message excludes an indication of a port, and wherein the processing system is operative in a second network that is different from the first network, transmitting, by the processing system, a query responsive to the receiving of the first message, obtaining, by the processing system, a second message based on the transmitting of the query, wherein the second message includes an indication of a first port, engaging, by the processing system, an authentication process whereby the processing system authenticates a first identity of the server and the server authenticates a second identity of the processing system, and receiving, by the processing system, the file from the server via the first port based on the engaging of the authentication process. Virtualized communication network 300 can facilitate in whole or in part receiving, by a processing system including a processor that is operative in a first communication network, a certificate from a communication device that is operative in a second communication network, extracting, by the processing system, an identifier of the communication device from the certificate, authenticating, by the processing system, the communication device in accordance with the identifier, comparing, by the processing system, the identifier with a plurality of identifiers to determine that the communication device is authorized to access data, resulting in an authorization determination, and transmitting, by the processing system, the data to the communication device based on the authorization determination.

In particular, in FIG. 3 a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
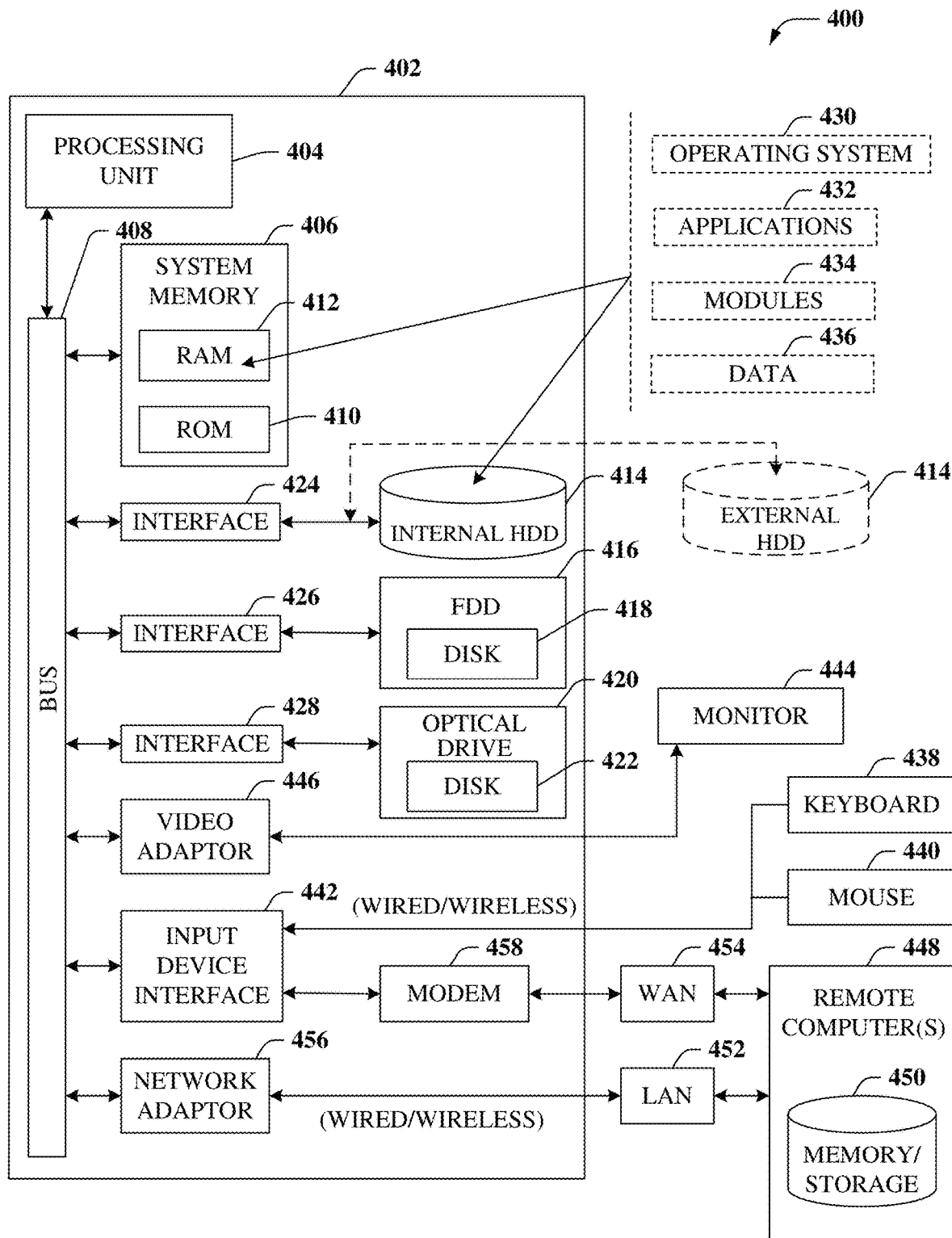
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software.

Computing environment 400 can facilitate in whole or in part identifying a type of communication traffic as occurring between a device and a client, wherein the device is operative in a first communication network and the client is operative in a second communication network that is different from the first communication network, responsive to the identifying of the type of communication traffic, transmitting a first request to the client for a first certificate, obtaining the first certificate from the client, wherein the first certificate includes a first identifier of the client, obtaining a second request from the client for a second certificate, transmitting the second certificate to the client, extracting the first identifier from the first certificate, resulting in an extracted identifier, determining that the client is authorized to obtain a file based on the extracted identifier, and transmitting the file to the client based on the determining that the client is authorized to obtain the file. Computing environment 400 can facilitate in whole or in part receiving, by a processing system, a first message from at least one communication device that is operative in a first network, wherein the first message includes an indication of a location of a file on a server that is operative in the first network, wherein the first message excludes an indication of a port, and wherein the processing system is operative in a second network that is different from the first network, transmitting, by the processing system, a query responsive to the receiving of the first message, obtaining, by the processing system, a second message based on the transmitting of the query, wherein the second message includes an indication of a first port, engaging, by the processing system, an authentication process whereby the processing system authenticates a first identity of the server and the server authenticates a second identity of the processing system, and receiving, by the processing system, the file from the server via the first port based on the engaging of the authentication process. Computing environment 400 can facilitate in whole or in part receiving, by a processing system including a processor that is operative in a first communication network, a certificate from a communication device that is operative in a second communication network, extracting, by the processing system, an identifier of the communication device from the certificate, authenticating, by the processing system, the communication device in accordance with the identifier, comparing, by the processing system, the identifier with a plurality of identifiers to determine that the communication device is authorized to access data, resulting in an authorization determination, and transmitting, by the processing system, the data to the communication device based on the authorization determination.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM),flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies.

Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
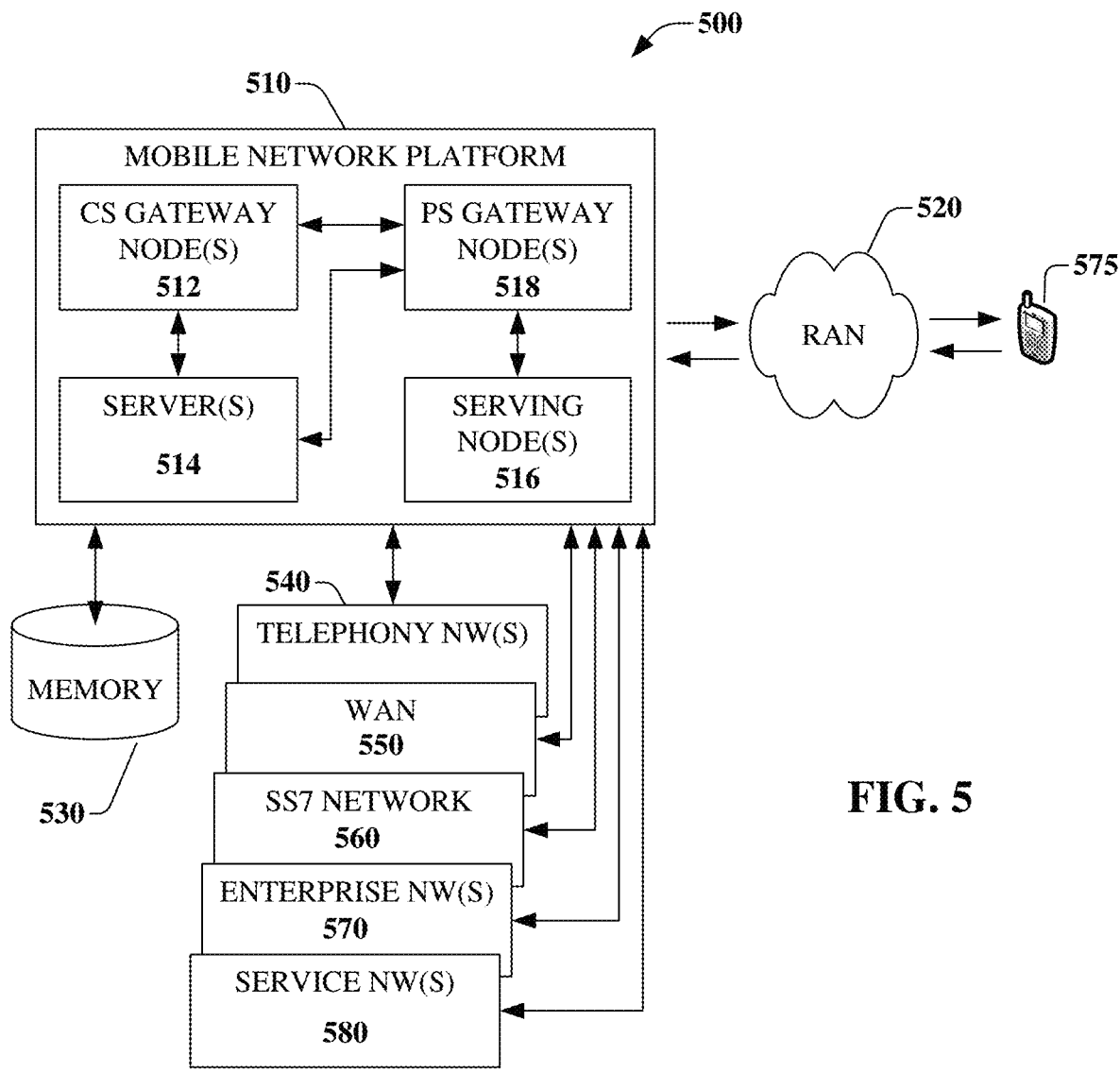
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part identifying a type of communication traffic as occurring between a device and a client, wherein the device is operative in a first communication network and the client is operative in a second communication network that is different from the first communication network, responsive to the identifying of the type of communication traffic, transmitting a first request to the client for a first certificate, obtaining the first certificate from the client, wherein the first certificate includes a first identifier of the client, obtaining a second request from the client for a second certificate, transmitting the second certificate to the client, extracting the first identifier from the first certificate, resulting in an extracted identifier, determining that the client is authorized to obtain a file based on the extracted identifier, and transmitting the file to the client based on the determining that the client is authorized to obtain the file. Platform 510 can facilitate in whole or in part receiving, by a processing system, a first message from at least one communication device that is operative in a first network, wherein the first message includes an indication of a location of a file on a server that is operative in the first network, wherein the first message excludes an indication of a port, and wherein the processing system is operative in a second network that is different from the first network, transmitting, by the processing system, a query responsive to the receiving of the first message, obtaining, by the processing system, a second message based on the transmitting of the query, wherein the second message includes an indication of a first port, engaging, by the processing system, an authentication process whereby the processing system authenticates a first identity of the server and the server authenticates a second identity of the processing system, and receiving, by the processing system, the file from the server via the first port based on the engaging of the authentication process. Platform 510 can facilitate in whole or in part receiving, by a processing system including a processor that is operative in a first communication network, a certificate from a communication device that is operative in a second communication network, extracting, by the processing system, an identifier of the communication device from the certificate, authenticating, by the processing system, the communication device in accordance with the identifier, comparing, by the processing system, the identifier with a plurality of identifiers to determine that the communication device is authorized to access data, resulting in an authorization determination, and transmitting, by the processing system, the data to the communication device based on the authorization determination.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
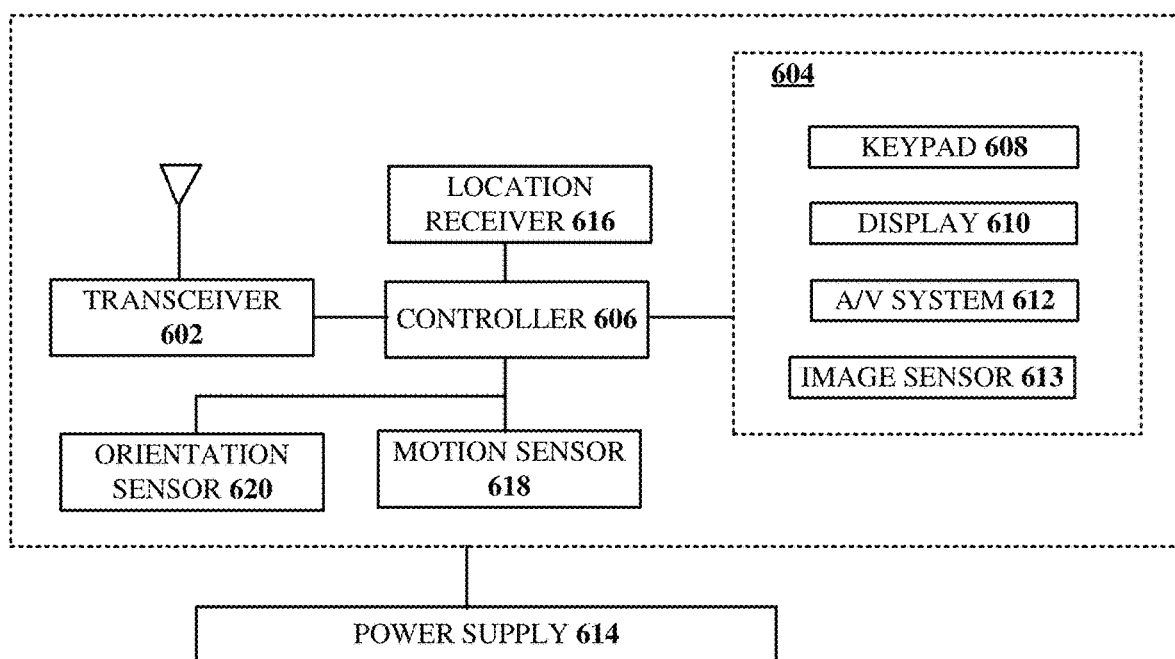
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part identifying a type of communication traffic as occurring between a device and a client, wherein the device is operative in a first communication network and the client is operative in a second communication network that is different from the first communication network, responsive to the identifying of the type of communication traffic, transmitting a first request to the client for a first certificate, obtaining the first certificate from the client, wherein the first certificate includes a first identifier of the client, obtaining a second request from the client for a second certificate, transmitting the second certificate to the client, extracting the first identifier from the first certificate, resulting in an extracted identifier, determining that the client is authorized to obtain a file based on the extracted identifier, and transmitting the file to the client based on the determining that the client is authorized to obtain the file. Computing device 600 can facilitate in whole or in part receiving, by a processing system, a first message from at least one communication device that is operative in a first network, wherein the first message includes an indication of a location of a file on a server that is operative in the first network, wherein the first message excludes an indication of a port, and wherein the processing system is operative in a second network that is different from the first network, transmitting, by the processing system, a query responsive to the receiving of the first message, obtaining, by the processing system, a second message based on the transmitting of the query, wherein the second message includes an indication of a first port, engaging, by the processing system, an authentication process whereby the processing system authenticates a first identity of the server and the server authenticates a second identity of the processing system, and receiving, by the processing system, the file from the server via the first port based on the engaging of the authentication process. Computing device 600 can facilitate in whole or in part receiving, by a processing system including a processor that is operative in a first communication network, a certificate from a communication device that is operative in a second network, extracting, by the processing system, an identifier of the communication device from the certificate, authenticating, by the processing system, the communication device in accordance with the identifier, comparing, by the processing system, the identifier with a plurality of identifiers to determine that the communication device is authorized to access data, resulting in an authorization determination, and transmitting, by the processing system, the data to the communication device based on the authorization determination.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, ..., xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
 a processing system including a processor; and
 a memory that stores executable instructions that, when executed by the processing system, facilitate performance of operations, the operations comprising:
  identifying a type of communication traffic as occurring between the device and a client communication device, wherein the device is operative in a first communication network and the client communication device is operative in a second communication network that is different from the first communication network;
  transmitting a first request to the client communication device for a first certificate based on the identifying of the type of communication traffic;
  obtaining the first certificate from the client communication device, wherein the first certificate includes a first identifier of the client communication device;
  extracting the first identifier from the first certificate, resulting in an extracted identifier;
  determining that the client communication device is authorized to obtain a file based on the extracted identifier;
  transmitting the file to the client communication device based on the determining that the client communication device is authorized to obtain the file;
  receiving the file from a first user equipment that is operative in the first communication network;
  storing the file at a location included in the memory;
  providing an indication of the location to the first user equipment;
  receiving a query from the client communication device, wherein the query includes the indication of the location; and
  responsive to the receiving of the query from the client communication device, transmitting a response that includes an indication of a port.

2. The device of claim 1, wherein the operations further comprise:
 obtaining a second request from the client communication device for a second certificate; and
 transmitting the second certificate to the client communication device, wherein the second certificate includes a second identifier of the device.

3. The device of claim 2, wherein the transmitting of the file to the client communication device is further based on the client communication device authenticating the device in accordance with the second identifier.

4. The device of claim 1, wherein the operations further comprise:
enabling the client communication device to record the file based on the extracted identifier.

5. The device of claim 1, wherein the file includes media, and wherein the operations further comprise:
enabling the client communication device to playback the media based on the extracted identifier.

6. The device of claim 1, wherein the operations further comprise:
enabling the client communication device to edit the file based on the extracted identifier.

7. The device of claim 1, wherein the operations further comprise:
enabling the client communication device to transfer the file to a second client communication device based on the extracted identifier.

8. The device of claim 7, wherein the enabling of the client communication device to transfer the file to the second client communication device is based on a determination that the second client communication device is operative in the second communication network.

9. The device of claim 1, wherein the transmitting of the file to the client communication device is further based on obtaining a payment from the client communication device.

10. The device of claim 1, wherein the client communication device is a server.

11. The device of claim 1, wherein the indication of the location includes an address, a uniform resource locator (URL), or a combination thereof.

12. The device of claim 1, wherein the operations further comprise:
establishing a socket between the device and the client communication device using the port indicated in the response,
wherein the transmitting of the file to the client communication device occurs via the socket.

13. A non-transitory machine-readable medium, comprising executable instructions that, when executed by a processing system including a processor, facilitate performance of operations, the operations comprising:
receiving a first message from at least one communication device that is operative in a first network, wherein the first message includes an indication of a location of a file on a server that is operative in the first network, wherein the first message excludes an indication of a port, and wherein the processing system is operative in a second network that is different from the first network;
transmitting a query responsive to the receiving of the first message;
obtaining a second message based on the transmitting of the query, wherein the second message includes an indication of a first port;
engaging an authentication process whereby the processing system authenticates a first identity of the server and the server authenticates a second identity of the processing system; and
receiving the file from the server via the first port based on the engaging of the authentication process.

14. The non-transitory machine-readable medium of claim 13, wherein the receiving of the file is further based on a determination by the server that the processing system is authorized to receive the file.

15. The non-transitory machine-readable medium of claim 13, wherein the at least one communication device communicates within the first network via a second port that is different from the first port.

16. The non-transitory machine-readable medium of claim 13, wherein the operations further comprise:
receiving a request for the file from a user equipment that is operative in the second network, wherein the request includes an identification of a location of the processing system where the file is stored; and
transmitting the file to the user equipment, based on the identification of the location, to fulfill the request.

17. A method, comprising:
receiving, by a processing system including a processor that is operative in a first communication network, a certificate from a communication device that is operative in a second communication network;
extracting, by the processing system, an identifier of the communication device from the certificate;
authenticating, by the processing system, the communication device in accordance with the identifier;
comparing, by the processing system, the identifier with a plurality of identifiers to determine that the communication device is authorized to access data, resulting in an authorization determination;
transmitting, by the processing system, the data to the communication device based on the authorization determination;
receiving, by the processing system, the data from a first user equipment that is operative in the first communication network;
storing the data at a location included in a memory of the processing system;
providing an indication of the location to the first user equipment;
receiving a query from the communication device, wherein the query includes the indication of the location; and
responsive to the receiving of the query from the communication device, transmitting a response that includes an indication of a port.

18. The method of claim 17, wherein the transmitting of the data to the communication device includes transmitting a file that includes the data to the communication device, and wherein the transmitting of the file facilitates a provisioning of a communication service to the communication device, the method further comprising:
transmitting, by the processing system, a second certificate to the communication device, wherein the second certificate includes a second identifier of the processing system, wherein the transmitting of the file to the communication device is further based on the communication device authenticating the processing system in accordance with the second identifier.

19. The method of claim 18, wherein the communication service includes voice.

20. The method of claim 18, wherein the communication service includes video on demand, streaming video, or a combination thereof.

* * * * *